US011084324B2

(12) United States Patent
Turner (10) Patent No.: US 11,084,324 B2
(45) Date of Patent: Aug. 10, 2021

(54) SAFETY RESTRAINT FOR BREAK-AWAY WHEEL ASSEMBLIES

(71) Applicant: Tether Tech Safety, LLC, Calumet, OK (US)

(72) Inventor: William Turner, Yukon, OK (US)

(73) Assignee: Tether Tech Safety, LLC, Fort Cobb, OK (US)

( * ) Notice: Subject to any disclaimer, the term of this patent is extended or adjusted under 35 U.S.C. 154(b) by 163 days.

(21) Appl. No.: 16/514,187

(22) Filed: Jul. 17, 2019

(65) Prior Publication Data

US 2020/0384807 A1 Dec. 10, 2020

Related U.S. Application Data

(63) Continuation-in-part of application No. 16/432,432, filed on Jun. 5, 2019.

(51) Int. Cl.
*B60B 37/10* (2006.01)
*B60B 35/08* (2006.01)

(52) U.S. Cl.
CPC .............. *B60B 37/10* (2013.01); *B60B 35/08* (2013.01)

(58) Field of Classification Search
CPC ......... B60B 35/08; B60B 27/02; B60B 37/10; B60B 35/16; B60B 35/04; B60B 2900/3313; B60B 2900/3314; F16B 39/282; B62K 25/02
See application file for complete search history.

(56) References Cited

U.S. PATENT DOCUMENTS

| 3,486,797 | A | 12/1969 | Osborne |
| 3,944,285 | A | 3/1976 | Vincent |
| 5,560,687 | A | 10/1996 | Hagelthorn |
| 5,795,037 | A | 8/1998 | Hagelthorn |
| 5,954,151 | A | 9/1999 | Cocharane et al. |
| 6,070,893 | A | 6/2000 | Thorndyke et al. |
| 7,000,995 | B2 | 2/2006 | Hagelthorn |
| 7,228,932 | B2 | 6/2007 | Rosenthal et al. |
| 7,547,077 | B2 | 6/2009 | Melberg et al. |
| 9,970,486 | B2 | 5/2018 | Hagelthorn |
| 2003/0015909 | A1 | 1/2003 | Meek, Jr. |
| 2013/0213764 | A1 | 8/2013 | Lawless |

OTHER PUBLICATIONS

USPTO; Notice of Allowance dated Jan. 14, 2021 in related U.S. Appl. No. 16/432,432, filed Jun. 5, 2019.
Park, Jim; "Why do wheels come off trucks?", Oct. 7, 2013; retrieved Dec. 19, 2018 from https://www.truckinginfo.com.
Crosby Group LLC; "Angular Contact Bearing Swivels"; 2017.

(Continued)

*Primary Examiner* — Karen Beck
(74) *Attorney, Agent, or Firm* — Robert H. Frantz (57) ABSTRACT

A semi-trailer wheel restraint system having at least one bearing or swivel, or a combination of bearing(s) and swivel(s), and one or more cable sections and one or more hub cab attachments for receipt into one or more wheel assemblies and through a hollow core of the trailer's axle. During a wheel bearing failure, the wheel restraint system keeps the loose wheel assembly near the end of the axle by anchoring it to the opposite-end's hub cap, thereby preventing a run-away wheel assembly and providing an operator of the truck an opportunity to safely stop the rig.

17 Claims, 8 Drawing Sheets (56) References Cited

OTHER PUBLICATIONS

ESCO Corp.; "Rigging Products Specifications"; document P7000RIG01L0112.
Hanes Supply Inc.; "Section 3: Wire Rope Assembly and Fittings", pp. 3-A, et seq.
Hendrickson; "Technical Procedure: Trailer suspension systems standard wheel service wheel-end"; Mar. 2018, document LIT No. L496, Revision 1.
Park, Jim; "Keeping your wheesl on", Oct. 15, 2013, retrieved Dec. 19, 2018 from https://www.truckinginfo.com.
Monster, R. F.; "Wheel separations from commercial vehicles: Experiences in Ontario", 2004; Proceedings of the Canadian Multidisciplinary Road Safety Conference XIV.
National Transportation Safety Board; "Safety Recommendation", Oct. 23, 1992; retrieved from https://www.ntsb.gov/safety/safety-recs/recletters/H92_98_101.pdf.
PWB Anchor; "Product Catalogue—2014 Edition".
Vis Automation Service; "Squirrel Wheel Safety Device"; retrieved Dec. 26, 2018 from http://demarytruck.com/tire-squirrel/.
The Cable Connection; "Wire Rope Assemblies and Fittings", 2009.
GMB; "Wheel bearing parts"; retrieved on Jul. 14, 2019 from https://www.gmb.jp.

SAFETY RESTRAINT FOR BREAK-AWAY WHEEL ASSEMBLIES

FIELD OF THE INVENTION

The invention generally relates technologies to prevent run-away wheel assemblies after a mechanical failure such as a wheel bearing failure on an over-the-road trailer.

BACKGROUND OF INVENTION

For the purposes of this disclosure, the term "hollow trailer axle" shall refer to any of a variety of axles employed on a variety of towed trailers, such as over-the-road semi-trailers, tractor trailers, and the like, as well as any other axle for a vehicle which is hollow through its core.

Figure 2:
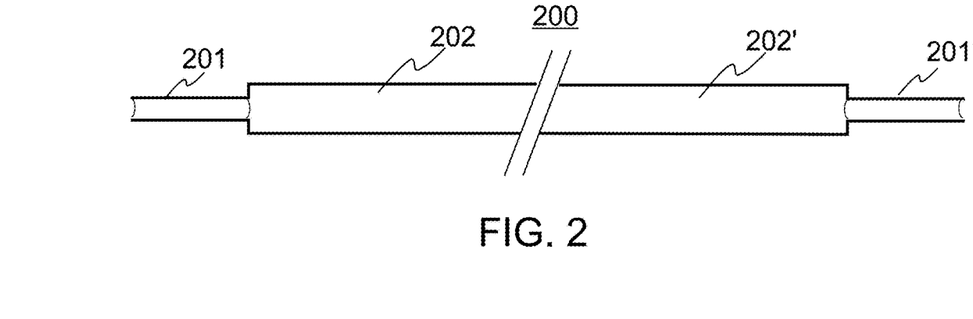
FIG. 2 shows a lengthwise cut-away view of a generalized hollow semi-trailer axle for reference understanding the disclosed embodiments of the present invention.

FIG. 2 (not shown to scale) provides a functional, lengthwise cut-away view of a generalized hollow trailer axle (200), which generally comprises of a larger diameter center portion (202-202'), with a smaller diameter hub portion (201, 201') at either end. The hub portions and center portion are generally constructed of sections of high-strength round metal tubes, such that the core of the axle from end to end is hollow. The transition between the hubs and the center portion may include several steps, flares, and increments in order to receive and axially-orient the components of the brake and wheel assemblies. The hubs themselves may be parallel (straight) (as shown) or tapered. Hubs are typically provided with threads on the outside surface for receiving one or more spindle nuts.

Figure 3:
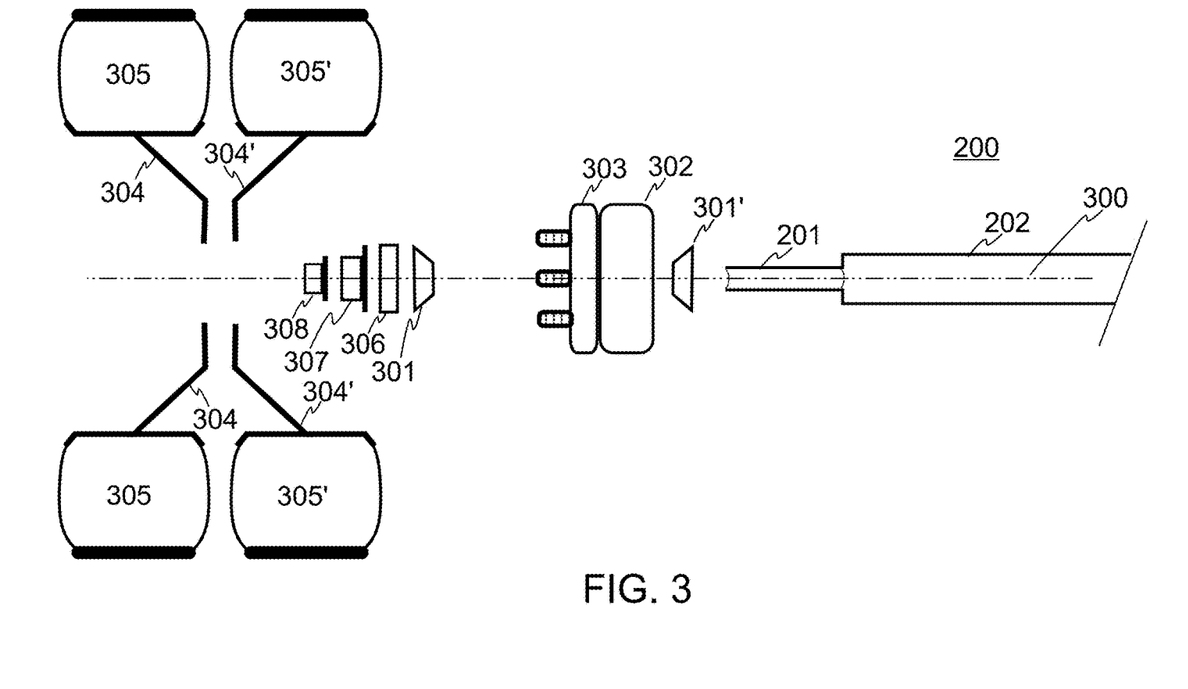
FIG. 3 illustrates a plurality of generalized axle and wheel system components and sub-assemblies of a typical hollow semi-trailer axle for reference understanding the disclosed embodiments of the present invention.
Figure 4:
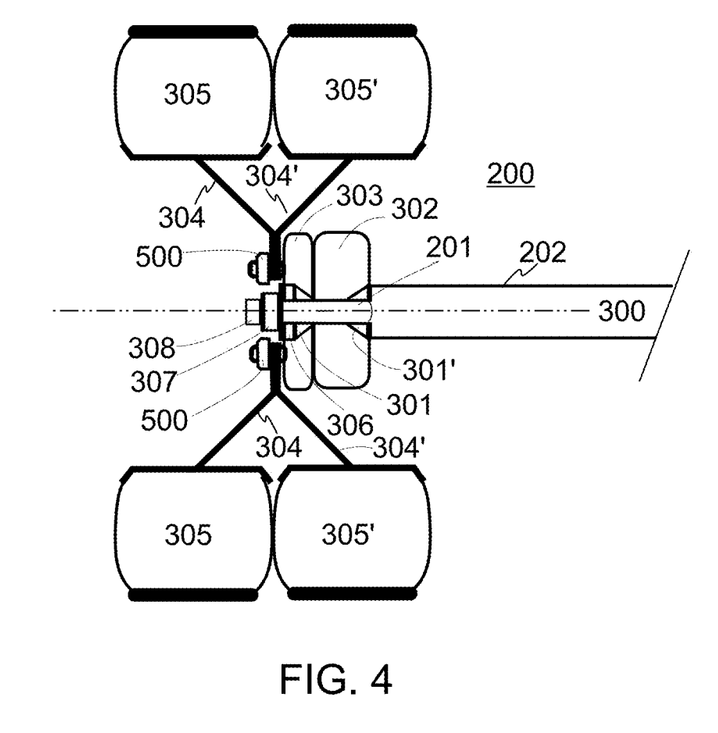
FIG. 4 shows the components of FIG. 3 in an assembled configuration.

FIG. 3 (not shown to scale) illustrates an exploded view of a generalize set of components which are received onto a hub (201), aligned on the center (300) of the axle. Generally speaking, an inner bearing group of components (301') is received onto the spindle (201), which might include an inner bearing and a hub seal. Then, a brake system (302) and a hub with lugs (303) are received onto the spindle (201). These may include an air disc brake (ADB) hub and rotor assembly, a standard service conventional hub without a brake system, a cast spoke hub without a brake system, etc. Next, an outer bearing (301) is received onto the spindle (201), and secured by a spindle nut system (306). A spindle nut system may include an inner adjusting nut with lock washer, set screw, star lock washer, and an outer jam nut; a castle nut washer with castle nut and cotter key; or a one-piece spindle nut such as a Stemco [TM] PRO-TORQ [TM] nut with a retainer ring.

Figure 5:
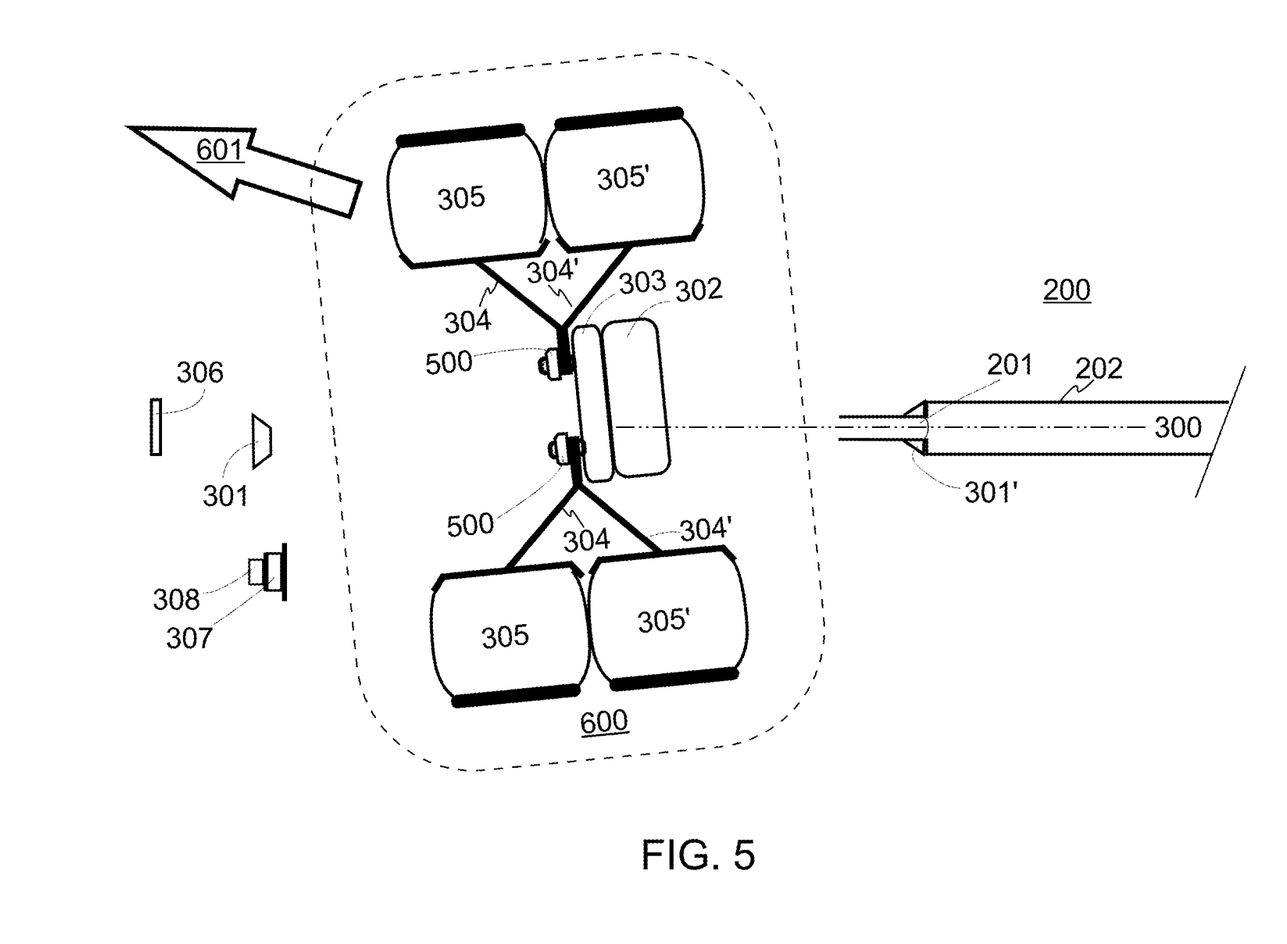
FIG. 5 depicts a typical failure mode following wheel bearing failure for reference understanding the disclosed embodiments of the present invention.

After the spindle nut system is installed, a hub cap gasket and a hub cap (307) are installed to cover and protect the greased bearings, and to close the end of the hollow spindle (201) to the outside environment. The hub cap is typically secured by a series of small bolts around the periphery of a mounting ring formed in the hub cap. Optionally, if the hub cap is provided with a hubcap oil fill port, a dust cap (308) is secured to the hub cap using a set of bolts, yielding an assembled hub assembly as shown in FIG. 5.

Subsequently, the wheel(s) (304, 304') with tires (305, 305') are passed over (around) the hub cap and dust cover to align mounting holes in the wheel(s) with the lug bolts on the hub (303), receiving the lug bolts through the wheel mounting holes. Lug nuts (500) are threaded onto the lug bolts, tightened to torque levels appropriate for the particular wheel, trailer, and load range, to yield a mounted wheel assembly, as shown in FIG. 6.

While the lug bolts, lug nuts, and their current torque levels are readily inspected by a truck driver or repair technician, the state of the bearings is not without disassembly of these components. The inner bearings are essentially impossible to inspect without disassembly, which is a time consuming task. And, the re-assembly may lead to errors which were not originally present prior to the inspection effort.

Figure 6:
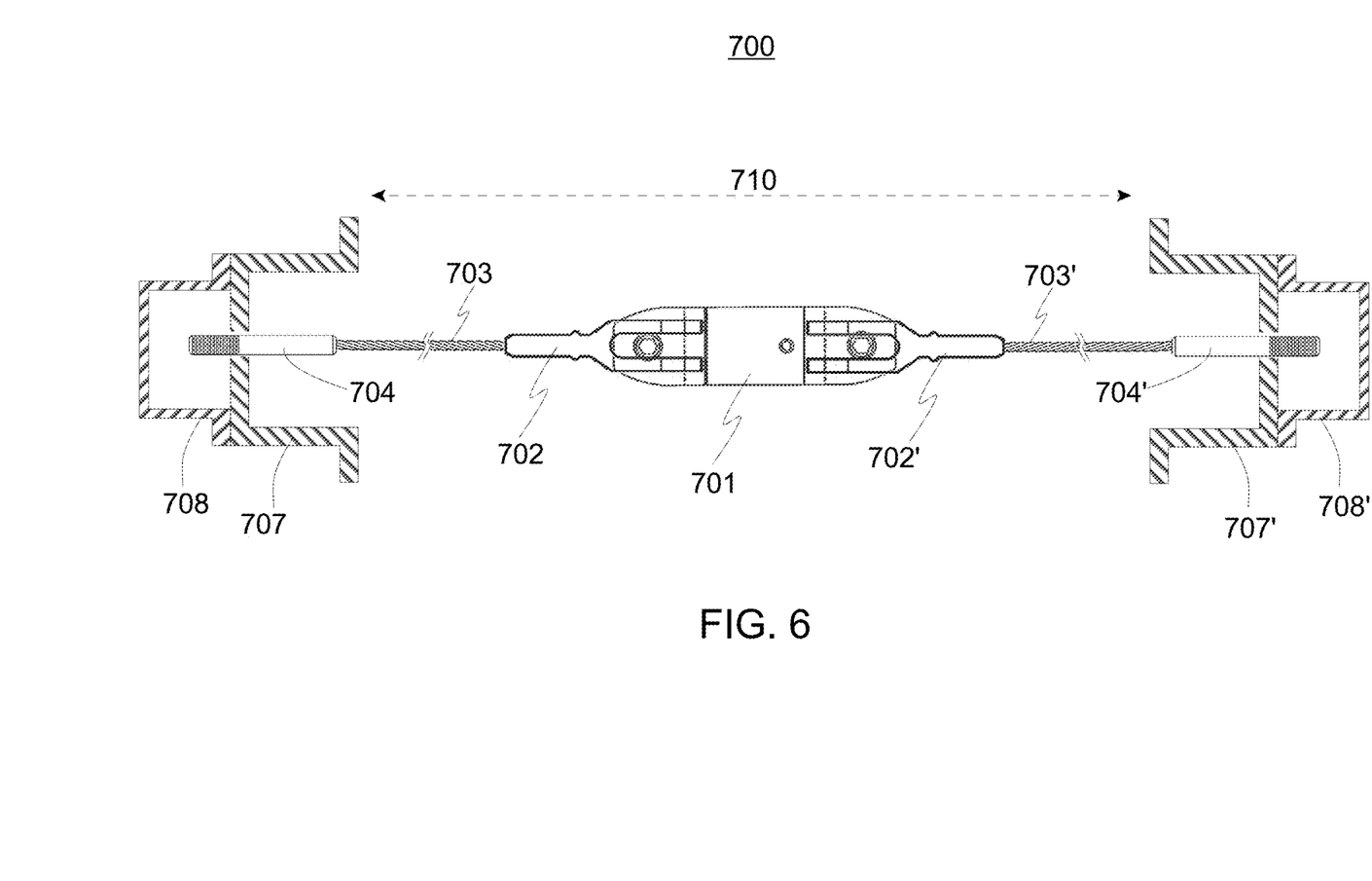
FIG. 6 sets forth an exemplary embodiment of a wheel retainer system according to the present invention.

When a wheel bearing (301, 301') fails, the components of the assembly shift off center (300), and it generally causes enough torque, heat and abrasion that the spindle nut system fails, so the wheels and tires (304, 304', 305, 305') with the still-attached hub (303) and brake system (302), as shown in FIG. 6, fly free of the axle assembly as a sub-assembly (600), often at a high rate of speed (601), as shown in FIG. 6. Combining the speed (601) with the weight of the break-away sub-assembly (600), which can weigh as much as 700 pounds, a very dangerous projectile is now loose and out of control. It can travel a great distance before stopping, causing considerably property damage, as well as injury and death to people and livestock.

FIGS. 2-6 are for general reference only, and represent the functional components of a typical trailer axle, hub and wheel system. In actual products, numbers of components, sizes, order of assembly, and names may vary to some degree, while still being represented by the generalizations of these figures.

SUMMARY DISCLOSURE OF THE INVENTION

A plurality of exemplary embodiments are described for a semi-trailer wheel restraint system having at least one bearing or swivel, or a combination of bearing(s) and swivel(s), and one or more cable sections and one or more hub cab attachments for receipt into one or more wheel assemblies and through a hollow core of the trailer's axle. During a wheel bearing failure, the wheel restraint system keeps the loose wheel assembly near the end of the axle by anchoring it to the opposite-end's hub cap, thereby preventing a run-away wheel assembly and providing an operator of the truck an opportunity to safely stop the rig.

BRIEF DESCRIPTION OF THE DRAWINGS

The description set forth herein is illustrated by the several drawings, which are not necessarily drawn to mechanical scale.

DETAILED DESCRIPTION OF EMBODIMENT(S) OF THE INVENTION

The inventor of the present invention has recognized a problem in the art not previously recognized or addressed regarding prevention of run-away, break-away or fly-away semi-trailer wheels. Some of these failures are due to lug nut over-torquing and/or lug bolt stress and wear. To the degree that these elements can be readily visually inspected by a technician without significant disassembly and re-assembly, these failures can be minimized by enhanced maintenance practices. However, the present inventor has recognized that the other run-away, break-away or fly-away semi-trailer wheels which due to bearing failures are much more difficult to prevent, and that existing technologies on the market are insufficient and/or ineffective for a number of reasons. Therefore, the following structures are disclosed which are exemplary of the invention which is inexpensive, effective, and readily installed on existing hollow axle assemblies. While certain components and certain dimensions and specifications may be disclosed, it will be recognized by those skilled in the art that certain substitutions may be made without departing from the spirit and scope of the present invention.

Turning to FIG. 6, a new assembly for a wheel restraint (700) is shown. It includes at least one new hub cap (708) (retainer bolts not shown for clarity of the drawing), an optional new or standard dust cap (707) (retainer bolts not shown for clarity of the drawing). The new hub cap (708) preferably has a hole formed in the center of it to receive an attachment end, such as a threaded bolt, of a restraint cable assembly (outer-end retention nut(s) not shown for clarity of the drawing). Attached to an inner end of the attachment end is a tether (703), such as a portion of wire rope, a connector (702), and an inline bearing swivel (701). On the opposite end of the swivel (702) is preferably a similar series of components (702', 703', 704', 708', and various nuts, pins, etc., not shown for drawing clarity).

For a typical semi-trailer, a particular embodiment might be specified for a 5,000 pound steady load (during wheel bearing failure), with a 25,000 pound surge, so one might utilize Style TTS threaded studs (available from Hanes Supply, Inc., of Buffalo N.Y.), two lengths of ½" 7×7 stainless steel wire rope (type 302/304, available from The Cable Connection [TM] of Carson, Nev.), a bullet-style bearing swivel having less than 4" outer diameter (available from The Crosby Group LLC of Tulsa, Okla.), and two stainless steel connectors to attach the wire rope to the swivel in an appropriate manner (Holerite [TM] sockets available from ESCO Corporation of Portland, Oreg.). The overall length (710) of the retainer system (700) should be sized to match the length of the intended axle for protection. The cable connections can be swaged or swageless, and the cable can be replaced with other suitable, flexible components, such as but not limited to lengths of chain. Parts of the assembly may be coated in a plastic to protect the components from metal-to-metal impacts, and from exposure to grease, oil, etc.

Figure 1:
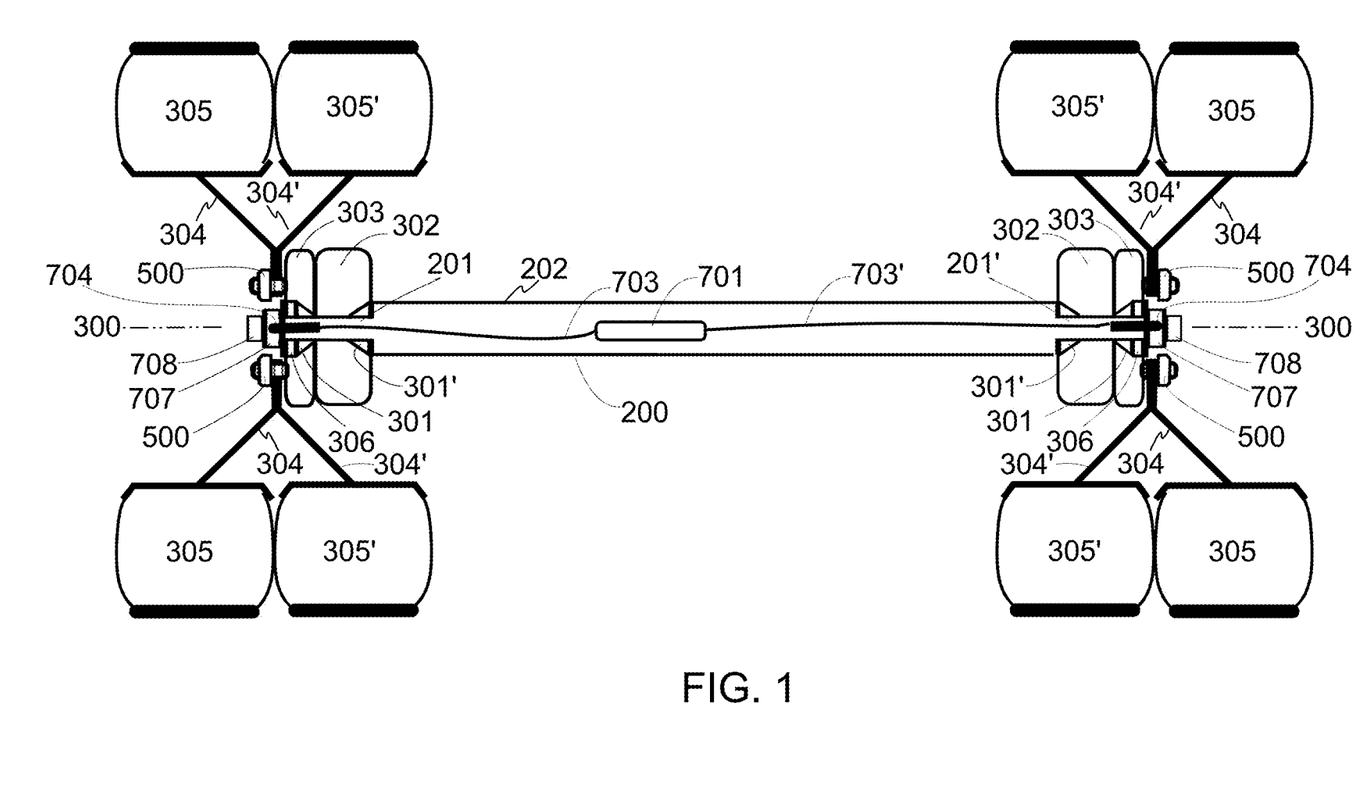
FIG. 1 illustrates an embodiment according to the present invention of a wheel restraint system installed into a hollow axle of a typical semi-trailer.

Referring now to FIG. 1, the wheel restraint system (700) can be installed on a hollow axle without removing the wheels, without removing the load in the trailer, and conveniently in a truck lot without requiring a mechanic's garage. The existing dust covers and hub caps on both wheels at opposite ends of the axle are removed, such as by removing a plurality of fastening bolts through a peripheral flange. After the open ends of the hollow axle are exposed, one threaded bolt on a first end (704') can be fished into and through the hollow core of the axle until it reaches the opposite end of the axle. This can be done many ways, such as by taping the first end to a rod which is greater than the length of the axle, and then pushing the rod into and through the hollow core, pulling the taped end (704'), cables and swivel into the hollow core with it.

At the opposite end, the threaded bolt can be affixed to the new hub cap (707) by passing the threaded bolt through the hole in the new hub cap (707), and securing it, such as with one or more washers, nuts, pins, retainer clips, etc. Now, the second end with the second threaded bold (704) remains at the originating end of the axle. A second new hub cap (707) is attached to the second end (704), such as with one or more washers, nuts, pins, retainer clips, etc., keeping tension in the wheel restraint system light for now. The two new hub caps (707) can now be fastened to the hub assembly, such as by re-installing a plurality of bolts, and torqued to specifications. The entire wheel restrain system (700) is now encased within the hollow core axle and spindles, except for the tips of the threaded studs (704, 704') and fasteners exposed outside the new hub caps (707).

Now, in a preferred embodiment, tension is applied to the wheel restrain system (700) by pulling on the exposed tips of the threaded studs, and tightening the fasteners to take up the slack. The pulling tension can be applied in a number of manners, such as by using a threaded tool to engage the bolts and provide for a manual pull handle, or by holding the tip of the threaded stud steady while rotating the fastening nut with a wrench. It should be noted that the tension being applied is merely for taking out the slack in the retainer system, but the tension is not necessarily great enough to retain the wheels during a wheel bearing failure. Finally, the optional dust caps (708) are installed on both wheels, and installation is complete in just a few minutes.

During a wheel bearing failure, the movement (601) of the loose wheel assembly (600) will be restricted to stay near the end of the axle, thereby preventing the loose wheel assembly (600) from flying free from the moving truck. This failed wheel will now likely cause sparks, smoke and/or vibration which will be noticeable by the driver and/or passersby, allowing the driver to bring the rig to a safe stop, keeping the loose wheel assembly with or nearby the end of the axle.

Figure 7:
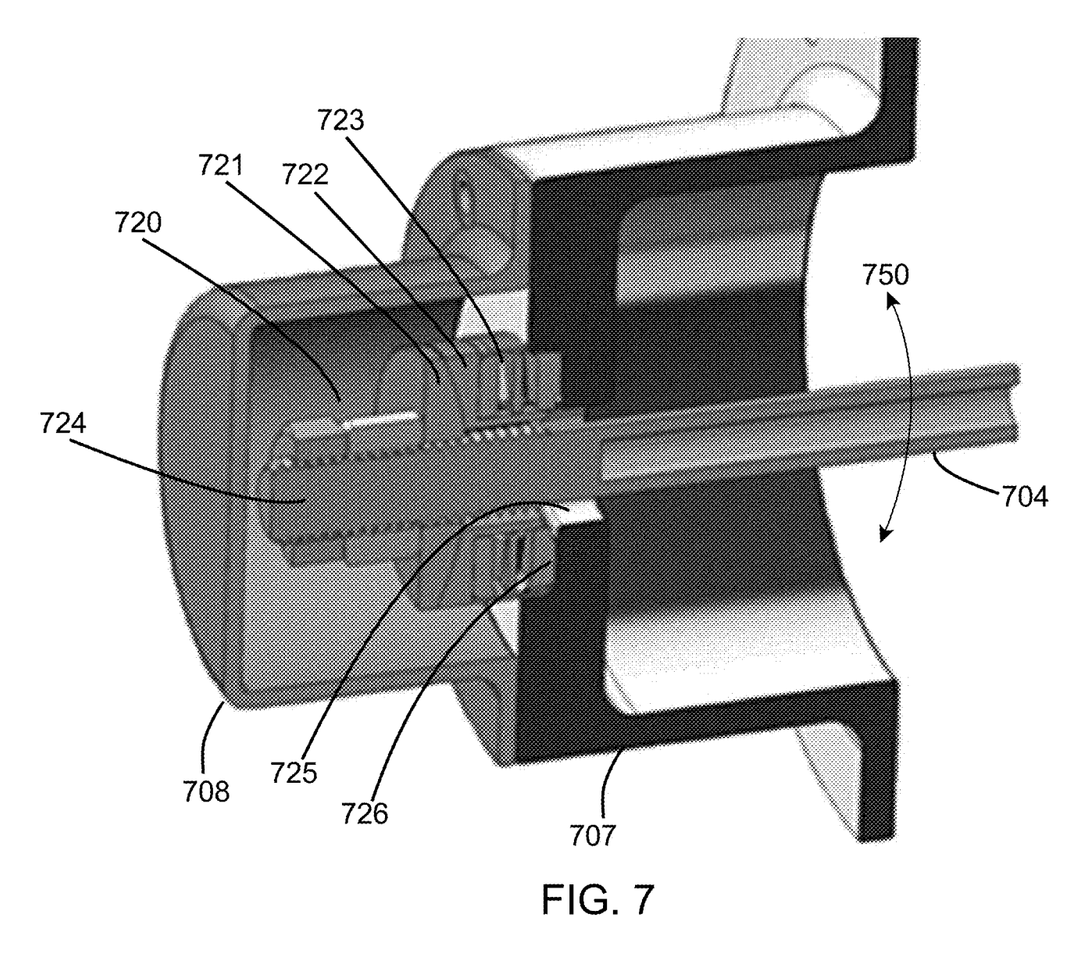
FIG. 7 illustrates a cut-away view of another embodiment of the present invention in which at least one bearing or swivel is positioned at a hub cap, and the cable or tether connection to the hub cap is enabled to pivot.

FIG. 7 shows a cut-away view taken along the center of a hub cap and dust cover assembly with certain improvements and new components. In this particular embodiment according to the present invention, one or more of the hub caps (707) are modified and improved to include a retention bearing register (726), such as an indentation, recess, annular ring, or combination thereof, to receive an additional bearing as a retention bearing (723). Further, the aperture (725) through which the threaded stud (704) is received is widened well beyond the outer diameter of the threaded stud. In this embodiment, one or two new and unique components are incorporated—a dish pivot (721) and, optionally, a dish pivot socket (722). In this exemplary embodiment, the dish pivot is a circular component, similar to a flat washer, but having a dish-shaped face on at least one side of it, such as a convex face. The dish pivot socket in this exemplary embodiment is also similar to a flat washer, but it has an opposite matching face, such as a concave face, to receive the dish-shaped face on the dish pivot. In some embodiments, the concave-convex relationship may be reversed. In other embodiments, the receiving (inner) face closest to the axle, may be machined into or otherwise provided by a portion of the bearing (723), such as a radius corner on an inner portion of a wheel bearing. Finally, the stud (704) and attached tether (not shown in this view) are retained through the center of the aperture (725) and the center of the retention bearing (723) by one or more fasteners (720) at the distal end of the stud (724), such as by a pair of lock nuts (shown), a washer and retention pin, or other suitable fastener.

In these variations of embodiments, when the wheel bearing (301) fails and the wheel assembly (600) begins to separate from the axle (200), the dish pivot and dish pivot socket allow the stud to pivot (750) relative to the usual orthogonal orientation to the wheels and relative to essentially parallel orientation of the tether through the center of the axle. In this arrangement of components, the one or two portions of tether are not necessary spinning at the speed of the wheels at the time of separation, and may be spinning at a very low rate of rotations per minute, such that when and if the tether or stud comes into contact with the axle, which is not spinning, there will be less damage to the tether or stud. This will prolong the life of the retention system, giving the operator of the vehicle more time to take corrective action (brake, pull over, etc.).

In some embodiments, the additional wheel bearings of FIG. 7 may be used in conjunction with the swivel of FIG. 6. In other embodiments, the swivel may be eliminated, and the additional wheel bearings of FIG. 7 may be utilized with a single portion of tether extending between the studs (704, 704') through the hollow core of the axle. This latter configuration may result in a lower product cost due to the elimination of the cost of the swivel and connector components and their associated assembly steps. Installation to a vehicle, however remains essentially the same in any configuration—swivel only, swivel with additional bearings, and additional bearings only.

Figure 8:
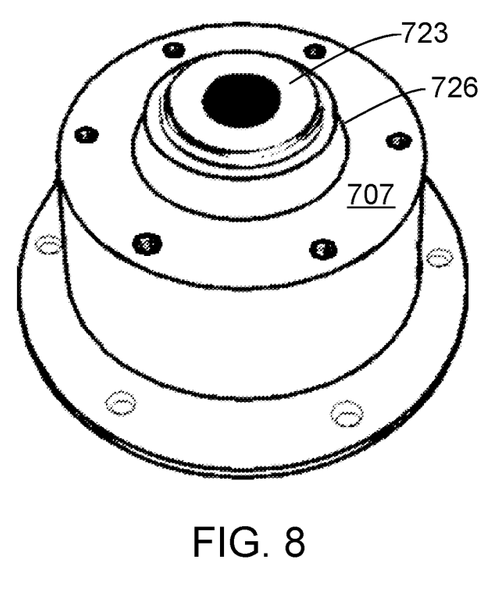
FIG. 8 provides a photograph of a partial assembly of an embodiment such as the one shown in FIG. 7.

FIG. 8 illustrates a partial assembly according to FIG. 7, in which a wheel hub (707) has been improved to provide the bearing register (726) to receive an additional wheel bearing (723). In this particular embodiment, the hub (707) is made from machined steel, provided with mounting holes through which bolts or screws may be received to retain the hub onto the wheel assembly and to receive a dust cover, and the bearing register (726) is at least partially formed by providing an annular wall or rim to receive the additional bearing, as shown. It should be noted that the hub and/or dust cover can be attached to the wheel assembly using other convention means, such as by threading, pinning, etc., instead of or in addition to screws or bolts.

Figure 9:
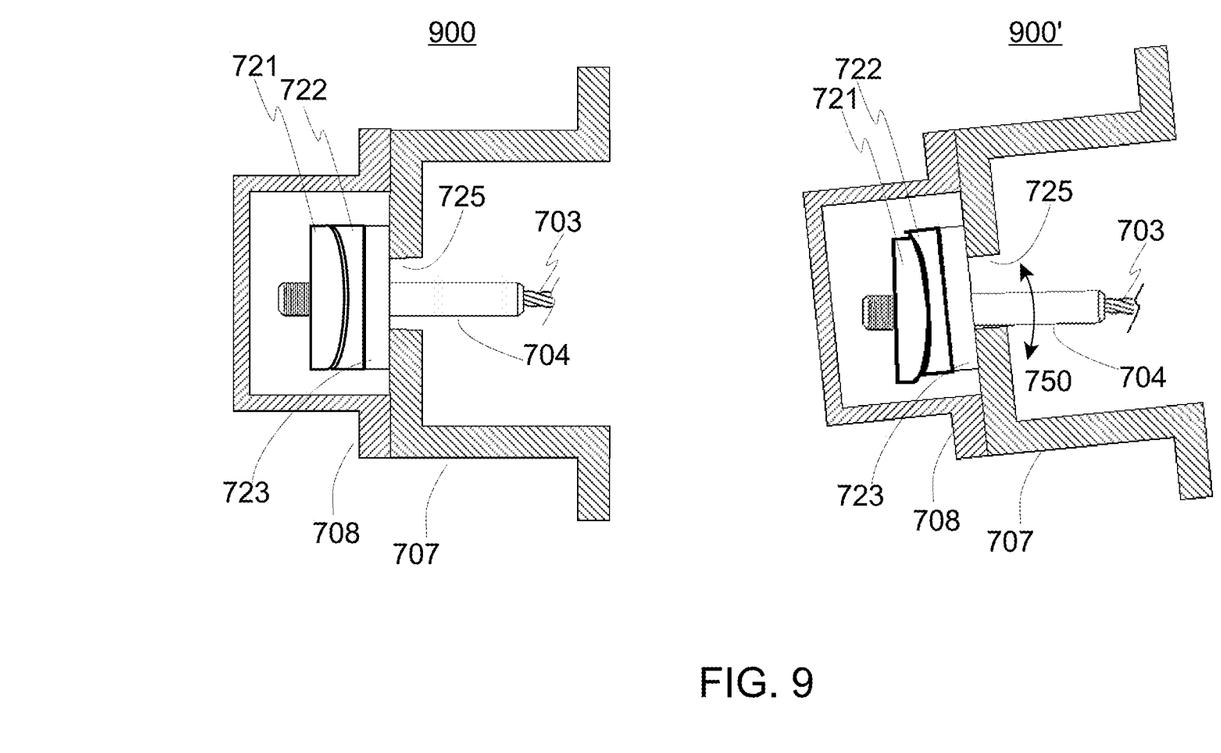
FIG. 9 illustrates a functional view of the pivoting provided by the widened restrain aperture and the dish pivot.

Referring now to FIG. 9, a functional diagram of such a pivoting embodiment according to the present invention is shown in a normal (900) position and a pivoted position (900') (fasteners for the bolt (704) are not shown for simplicity of illustration). In the pivoted position (900'), the wheel assembly has broken from the axle, tilted, and is being retained by the cable (703) and bolt (704), which is tilted (750) as it passes through the enlarged aperture (725) in the hub cap (707). The dish pivot (721) retains the cable attached to the hub cap, albeit at a pivoted or tilted angle relative to the retainer bearing (723).

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A wheel restraint system comprising:
   a first end of a tether attached to a first hub cap at a first end of a hollow axle;
   a second end of a tether passable through the hollow axle to a second end of the hollow axle; and
   a second end of the tether being attachable to a second hub cap at the second end of the hollow axle;
   wherein at least one rotatable interconnect is provided between the first and second hub caps to allow the first end of the tether and the second end of the tether to rotate at different speeds and in different directions.

2. The wheel restraint system as set forth in claim 1 wherein further comprising:
   an over-sized aperture formed into a center of the first hub cap which exceeds an outer diameter of a tether-attachment stud, wherein the first hub cap is configured for attaching the tether to a wheel assembly via the first hub cap;
   a retention bearing register formed into the first hub cap, the register being concentric with the over-sized aperture;
   at least one retention bearing received into the bearing register serving as the rotatable interconnect;
   a tether-attachment stud having a distal end received through the over-sized aperture, through the retention bearing, and through at least a dish pivot, being secured at the distal end, and having a portion of tether attached to an inner end, wherein the tether is suitable for being received through a hollow core of an axle for securing a wheel assembly upon separation from the axle due to a failure of a wheel bearing.

3. The system as set forth in claim 2 wherein the dish pivot socket has a concave face facing towards the retention bearing.

4. The system as set forth in claim 2 wherein the concave face facing towards the retention bearing is received by a radius of an inner race of the retention bearing.

5. The system as set forth in claim 2 wherein the concave face facing towards the retention bearing is received by matching convex face of a dish pivot socket, wherein the dish pivot socket is disposed between the retention bearing and the dish pivot.

6. The system as set forth in claim 2 wherein the tether-attachment stud comprises a threaded stud.

7. The system as set forth in claim 2 further wherein the tether comprises a section of wire rope.

8. The system as set forth in claim 2 further wherein the tether comprises a section of chain, rope or a combination of chain and rope.

9. The system as set forth in claim 2 wherein the retention bearing register comprises a recess formed into hub cap.

10. The system as set forth in claim 2 wherein the retention bearing register comprises a wall provided onto the hub cap.

11. The system as set forth in claim 2 wherein the retention bearing register comprises an annular ring provided onto the hub cap.

12. A method of providing a wheel restraint system comprising:
attaching a first end of a tether to a first hub cap at a first end of a hollow axle;
passing a second end of the tether through the hollow axle to a second end of the hollow axle; and
attaching the second end of the tether to a second hub cap at the second end of the hollow axle;
wherein at least one rotatable interconnect is provided between the first and second hub caps to allow the first end of the tether and the second end of the tether to rotate at different speeds and in different directions.

13. The method as set forth in claim 12 wherein the rotatable interconnect comprises a swivel.

14. The method as set forth in claim 13 wherein the swivel is disposed along the tether between the first end of the tether and the second end of the tether.

15. The method as set forth in claim 12 wherein the rotatable interconnect comprises a bearing.

16. The method as set forth in claim 15 wherein the bearing is affixed between the first end of the tether and the first hub cap.

17. The method as set forth in claim 15 wherein the bearing is provided with a pivot between the first end of the tether and the bearing.

* * * * *